3,370,039
PROCESS FOR PREPARATION OF HIGH-MOLEC-
ULAR-WEIGHT POLYARYLOXYSILANES
James E. Webb, Administrator of the National Aeronautics and Space Administration with respect to an invention of William R. Dunnavant, Columbus, Ohio
No Drawing. Filed Feb. 17, 1967, Ser. No. 617,775
8 Claims. (Cl. 260—47)

ABSTRACT OF THE DISCLOSURE

A process for increasing the molecular weight of polyaryloxysilane polymers and upgrading their properties so that they can be fabricated into useful articles. Polyaryloxysilanes prepared by the reaction of a dianilinosilane and an organic diol, for example, dianilinodiphenylsilane and p,p'-biphenol, are mixed with a small amount of the dianilinosilane monomer and the mixture is heated under vacuum or inert gas sweep for at least thirty minutes at 200 to 300° C. This treatment converts the polymer from a brittle, low-molecular-weight form to a non-brittle, high-molecular-weight material suitable for further processing.

---

The invention described herein was made in the performance of work under a NASA contract and is subject to the provisions of Section 305 of the National Aeronautics and Space Act of 1958, P.L. 85–568 (72 Stat. 435, 42 U.S.C. 4257).

This invention relates to polymer processing and more particularly to a process for preparing high-molecular-weight polyaryloxysilanes from lower-molecular-weight forms of the same.

Polyaryloxysilane polymers, exemplified by the formula

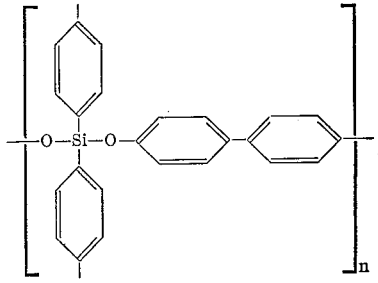

offer outstanding properties for materials applications in the aerospace field. These polymers show good thermal stability and stability to ultra-violet radiation in a vacuum, and they are potentially useful as thermo-plastic, thermo-setting or elastomeric material for structures, laminates or coatings which are to be subjected to the severe environment of outer space.

Polyaryloxysilanes are prepared by a polycondensation reaction of an organic diol with a dianilinosilane, p,p'-diphenol and dianilinodiphenylsilane for the polymer having the formula given above. This process is disclosed and claimed in copending application Ser. No. 506,135, field Nov. 2, 1965, by James E. Curry. The reaction is carried out by heating an equimolar mixture of the reactants under vacuum or inert amosphere to a temperature over 200° C. In laboratory scale preparations a high-molecular-weight, tough, non-brittle polymer having properties suitable for further processing can be obtained in this process by careful control of the purity of the silane monomer and exclusion of air and moisture from the reaction zone. Impurities in the silane monomer result in a brittle polymer of lower molecular weight (less than 45,000) which is not suitable for fabrication into useful products. The presence of air or the use of an excessively high temperature for the polymerization reaction results in a cross-linked insoluble polymer which is not amenable to further fabrication except by compression molding and which therefore has limited utility.

In pilot-scale and larger operations, however, the polymer produced by this reaction has not been suitable for further fabrication. Even when the purity of the starting monomers, the reaction atmosphere and temperature are carefully controlled, a brittle, low-molecular-weight (about 32,000 to 44,000) product similar to the small-scale polymer produced from impure monomer is obtained. In order to obtain a material with useful engineering properties a method must be provided to convert this product to a higher-molecular-weight, non-brittle polymer.

It is therefore an object of this invention to provide a process for converting brittle, low-molecular-weight polyaryloxysilanes to non-brittle, high-molecular-weight form.

Still another object is to provide a process for treating polyaryloxysilanes prepared in relatively large-scale operations to improve the physical and mechanical properties thereof.

Other objects and advantages of the invention will be apparent from the following description and claims.

In the present invention low-molecular-weight polyaryloxysilanes are converted to high-molecular-weight form by heating the polymer together with a small amount of dianilinosilane monomer under a vacuum or an inert gas sweep. The molecular weight is substantially increased, typically 45 to 90 percent, and brittleness and poor mechanical properties are eliminated. The process is reproducible for large-scale operation, and it allows the practical fabrication and use of polyaryloxysilanes for numerous applications.

Although this invention is not to be understood as limited to a particular theory, it is postulated that a portion of the silane monomer is thermally destroyed in the polymerization reaction, and the growing polymer chain is terminated by reaction with the phenol reactant. The upgrading of polymer properties probably results from coupling together a phenol-terminated polymers by the additional silane monomer provided in the present process. However, this effect cannot be produced by providing an excess of this reactant in the initial polymerization reaction; a second heating step in the presence of silane monomer is required. The occurrence of further chemical reaction in this step is indicated by the evolution of aniline.

The present invention is broadly applicable to polymers having the general formula

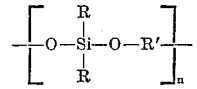

where R is an aryl or alkyl group and R' is an arylene group. These polymers are prepared by reacting the appropriate dianilosilane such as dianilinodiphenylsilane, ianilinomethylphenylsilane, dianilinodimethylsilane or dianilinomethylvinylsilane with a diol having the desired R' group, for example, hydroquinone, resorcinol, p,p'-biphenol, 2,7-napthalenediol, 2,2-propanebis(4-hydroxybenzene) and 4,4'-dihydroxydiphenylether. Although the invention will be described below primarily with reference to the polymer produced by reaction of p,p'-biphenol with dianilinodiphenyl silane, it is to be understood that the same mechanism applies to the entire group. The molecular weight at which the transition from tough to brittle polymer occurs will vary somewhat with the particular polymer, but in general the same conditions can be used in each case for converting the polymer to a higher-molecular-weight form.

The brittle polyarylsiloxane polymer obtained by reaction of a diol with a dianilinosilane is converted to non-brittle, higher-molecular-weight form by heating a mixture of the polymer and a small amount of dianilinosilane monomer under vacuum or an inert gas sweep. The amount of dianilinosilane added can be from 2 to 10 parts by weight per hundred parts of polymer, and about 5 parts is the preferred amount.

A temperature from 200 to 300° C. can be used in the heating step, and about 225 to 250° C. is preferred. Heating for a period of at least 30 minutes under a stream of an inert gas such as nitrogen or under a vacuum at least about 25 inches of mercury is required for maximum increase in molecular weight. Although not critical, it is preferred to first heat the polymer until it melts (about 180° C.) under vacuum or inert atmosphere and then added the silane monomer with stirring so that an intimate mixture can be obtained in the molten state.

The resulting up-graded polymer can be fabricated into useful forms such as sheets, moldings, fibers or coatings by conventional methods, including extrusion, compression molding and solvent casting.

This invention is further illustrated by the following examples.

*Example I*

Polyaryloxysilane polymer was prepared on a pilot-plant scale by the following procedure. A charge of 11,793 grams dianilinodiphenylsilane and 5,980 grams p,p'-biphenol was added to a ten-gallon stainless steel reactor equipped with an oil-fed heating jacket, an agitator, and provisions for maintaining a nitrogen gas atmosphere. Oil heated to 221° C. was circulated through the reactor jacket, and after 60 minutes the temperature of the reaction mixture reached 200° C. The polymerization reaction was then initiated, as evidenced by evolution of by-product aniline, which was swept from the reactor by a stream of heated, dry nitrogen. The mixture was heated for four hours, the temperature rising to 240° C. The mixture was further heated under agitation for one hour, at which time evolution of aniline ceased. The product polymer was then recovered at a yield of 99 percent. The average molecular weight of the product, as determined by gel permeation chromotography was 43,000. The product could be injection-molded at 125° C. under mild pressure or pressed into film, but the films and molded samples were brittle.

Further runs were carried out using the same equipment and reactant charge. In one of these runs the above procedure was used except that the mixture was agitated throughout the reaction, and a total heating time of 6.5 hours was used. In another run a vacuum was applied when evolution of aniline began, and a heating time of 2.5 hours was used. The average molecular weights for these runs, as determined by gel permeation chromotography, were 49,000 and 32,000, respectively. The product in each run was brittle.

Ten-gram samples of polymer from each of the three runs described above were mixed with 5 weight percent dianilinodiphenylsilane and heated under vacuum for 0.66, one and one-half hour, respectively, at 225, 250, and 250° respectively. In each case the brittle polymer was converted to tough, non-brittle form, and the molecular weights of the samples after this treatment were 63,000, 58,000, and 61,000, respectively.

*Example II*

A 10,644 gram portion of polymer prepared in the run described above wherein a 6.5 hour heating time was used was heated to fusion in a reactor under a nitrogen atmosphere and 533 grams of dianilinodiphenylsilane was added. The resulting mixture was stirred and heated under a nitrogen atmosphere at 225 to 250° C. until aniline began to evolve. The mixture was then held at 225 to 250° C. for 45 to 60 minutes under a vacuum of about 25 inches of mercury with periodic agitation to facilitate aniline removal. The reactor was then pressurized with nitrogen to 30 to 40 pounds per square inch and the polymer was extruded into rods through a one-inch opening in the bottom of the reactor. The extruded rods were tough, and they could be immersed in liquid nitrogen for 30 minutes without developing any appreciable brittleness. The average molecular weight of the product was 57,000.

Polymer samples which were subjected to heating under inert atmosphere or vacuum in the manner described above, but in the absence of added silane monomer, failed to show any substantial improvement with regard to molecular weight or brittleness. The use of an excess of silane monomer in the polymer preparation likewise failed to effect any substantial improvement.

The above examples are merely illustrative and are not to be understood as limiting the scope of the invention, which is limited only as indicated by the appended claims.

What is claimed is:

1. The process for treating a polyaryloxysilane polymer having the formula

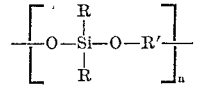

where R is an aryl or alkyl group and R' is an arylene group, said polymer having been prepared by reaction of a dianilinosilane and a diol, which comprises mixing said polymer with a small amount of said dianilinosilane and heating the resulting mixture under a vacuum or an inert gas sweep at a temperature of 200 to 300° C., whereby said polymer is converted to non-brittle, higher-molecular-weight form.

2. The process of claim 1 wherein said dianilinosilane is provided in said mixture at a proportion of 2 to 10 parts by weight per 100 parts of said polymer.

3. The process of claim 2 wherein said mixture is heated for a period of at least 30 minutes.

4. The process of claim 3 wherein said temperature is about 225 to 250° C.

5. The process of claim 3 wherein said mixture is heated under a vacuum of at least about 25 inches of mercury.

6. The process of claim 3 wherein said dianilinosilane is provided in said mixture at a proportion of about 5 parts by weight per 100 parts of said polymer.

7. The process of claim 3 wherein said dianilinosilane is dianilinodiphenylsilane and said diol is p,p'-biphenol.

8. The process of claim 7 wherein the starting molecular weight of said polymer is from about 32,000 to 44,000.

References Cited

737,230  9/1955  Great Britain.

DONALD E. CZAJA, *Primary Examiner.*

M. I. MARQUIS, *Assistant Examiner.*